Patented May 1, 1951

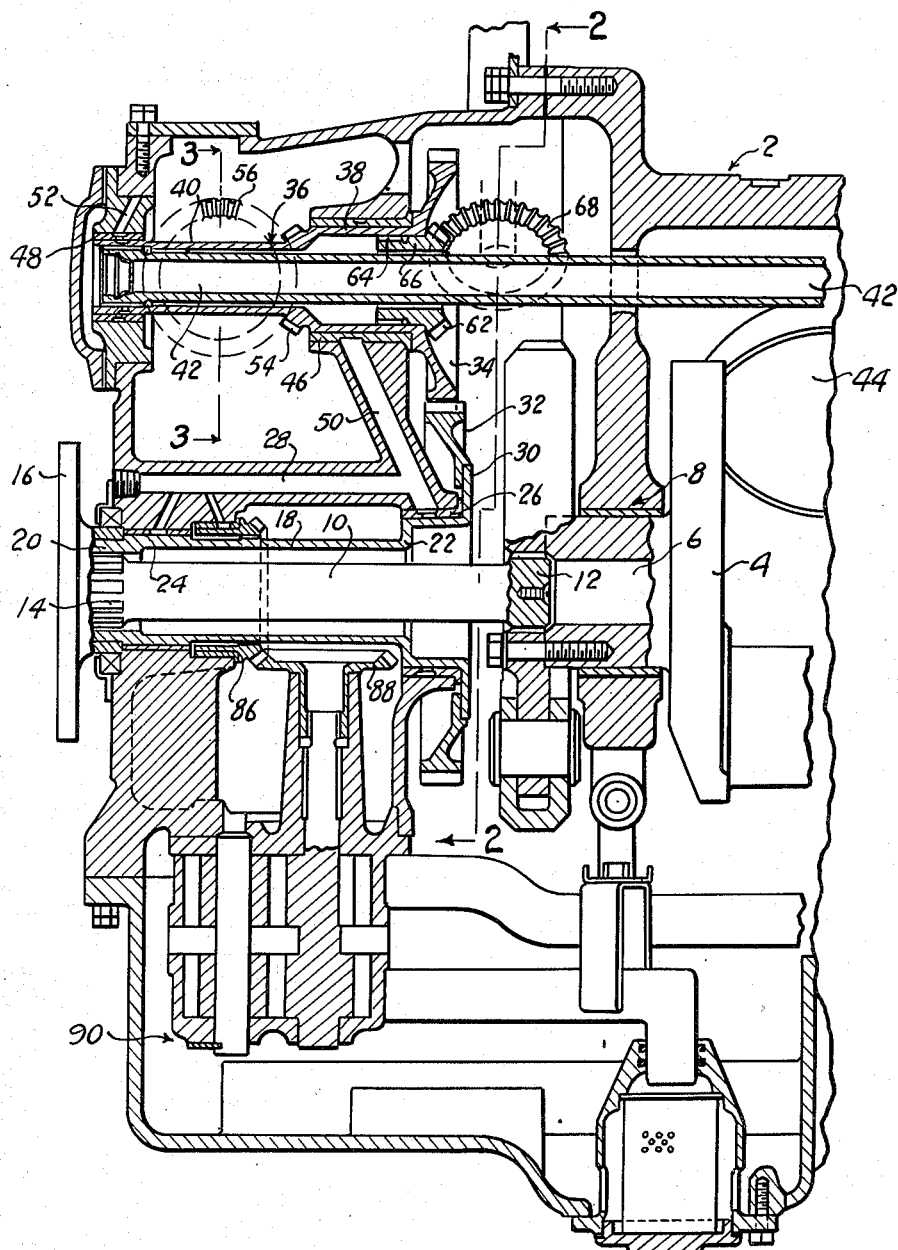

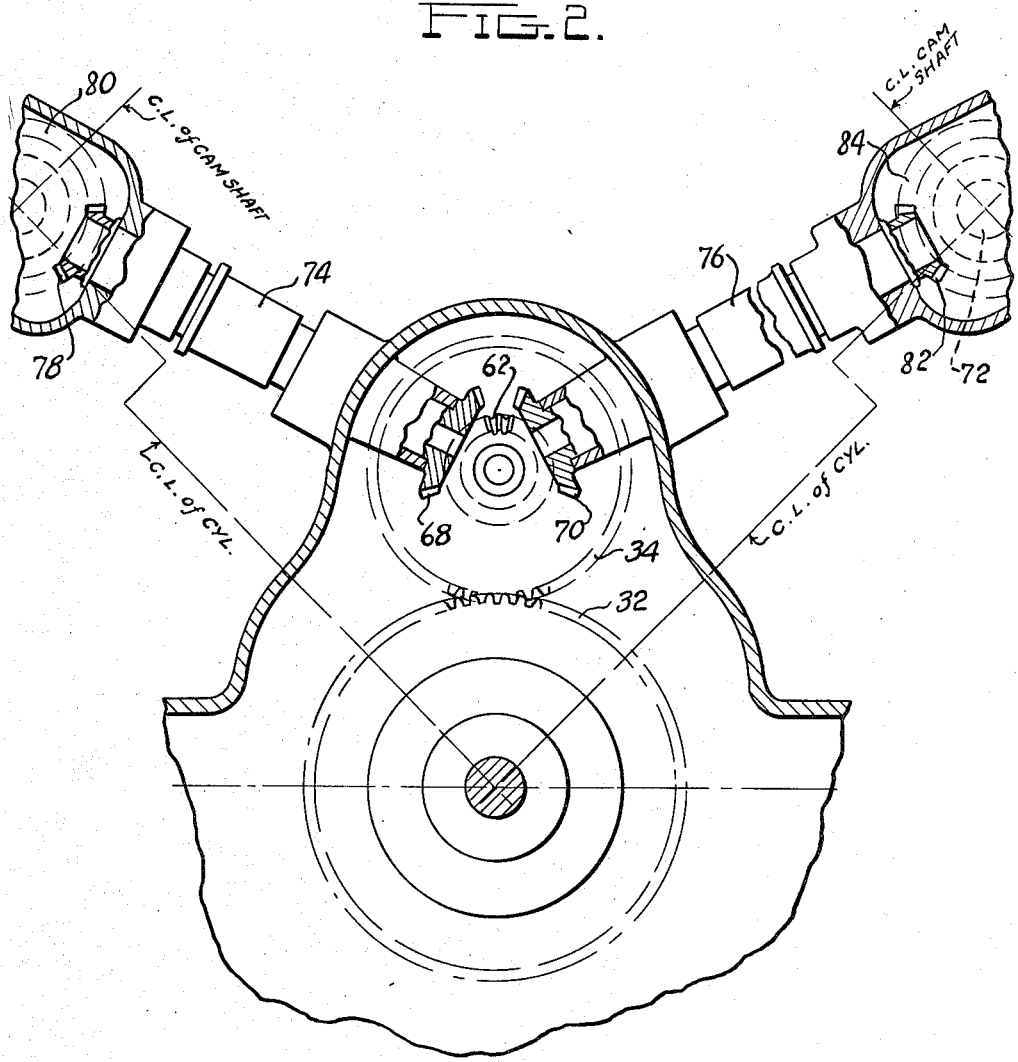

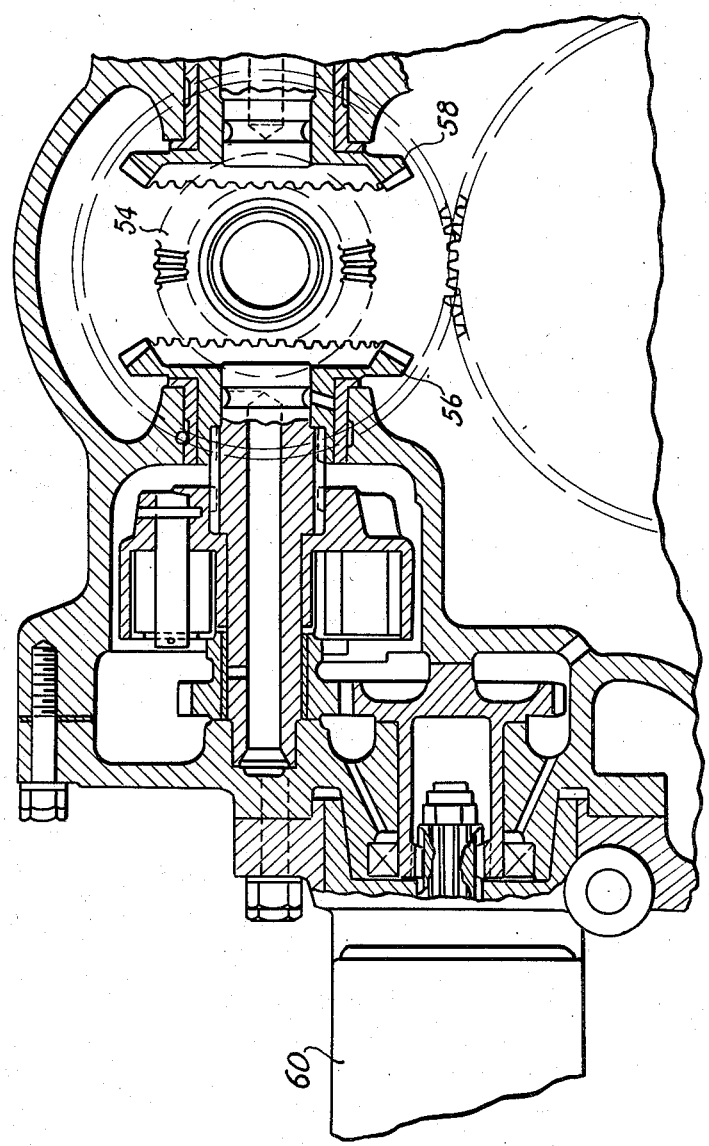

2,550,696

UNITED STATES PATENT OFFICE 2,550,696

TRANSMISSION GEARING

Richard E. Hiss, St. Clair Shores, Mich., assignor to Continental Motors Corporation, Detroit, Mich., a corporation of Virginia Application April 14, 1947, Serial No. 741,401

8 Claims. (Cl. 74—665)

This invention relates to an internal combustion engine, especially to internal combustion engines of the V-type. In many applications requiring internal combustion engines for power, space limitations are an important factor in the design of the power plant. Notwithstanding such limitations however it is nevertheless necessary that the power plant have certain minimum performance characteristics, and yet be possessed of certain desirable design features.

It is an object of this invention to provide an internal combustion engine power plant of the V-type which is provided with camshaft and auxiliary drives at one end of the crankshaft, these drives being compactly arranged so as to require a minimum of additional space, and being driven through a single connection to the crankshaft which is substantially self-aligning, thus removing the necessity for precision manufacture to effect meticulous alignment of many machined parts.

This and other objects are accomplished in an internal combustion V-type engine which is provided with a single power take-off extension at one end of the crankshaft and a sleeve drivingly connected to the outer end of the extension and extending back toward the crankshaft itself. Various auxiliary shafts of the camshafts are connected to be driven from the sleeve as will be seen from the following description and the accompanying drawings.

In the drawings:

Fig. 1 is a longitudinal section through the power take-off end of a V-type internal combustion engine made according to the invention.

Fig. 2 is a view in section substantially on line 2—2 of Fig. 1, and

Fig. 3 is a view in section substantially on line 3—3 of Fig. 1.

A V-type internal combustion engine indicated generally at 2 is shown having a crankshaft 4. One end 6 of crankshaft 4 is shown as being journaled in the bearing 8. A power take-off extension 10 is shown as having an inner end 12 and an outer end 14. Extension 10 is drivingly secured at its inner end 12 to the end 6 of crankshaft 4. A power take-off flange 16 is secured to the outer end 14 of extension 10 to be driven thereby.

A sleeve 18 having an outer end 20 and an inner end 22 is mounted to substantially envelop the power take-off extension 10. The outer end 20 of sleeve 18 is drivingly associated, as by means of splines, with the outer end 14 of extension 10. Sleeve 18 and extension 10 are rotatably supported in bearings 24 and 26. These are supplied with oil under pressure from oil duct 28.

The inner end 22 of sleeve 18 is preferably provided with a mounting flange 30, which carries and drives a gear 32. Gear 32 meshes with a second gear 34 which is mounted on and drives a sleeve 36. Sleeve 36 is provided with an enlarged diameter portion 38 to which gear 34 is attached, and a reduced diameter portion 40 which is drivingly associated at its outer end with an auxiliary shaft 42. Auxiliary shaft 42 extends forward between two banks of cylinders of the V engine. One cylinder of one of these banks is seen at 44. Auxiliary shaft 42 rotates about an axis which is substantially perpendicular of the crankshaft 4. The purpose of the first auxiliary shaft 42 will not be detailed here, but can be ascertained by reference to copending patent application Serial No. 747,026, filed May 9, 1947, and assigned to the assignee of this invention.

The enlarged diameter portion 38 of sleeve 36 is rotatably supported in a bearing 46; the smaller diameter portion 40 of the sleeve is rotatable in a bearing 48. Bearing 46 is lubricated by oil under pressure supplied through duct 50, and bearing 48 is supplied with oil from duct 52.

Between its ends, more specifically, at one end of enlarged diameter portion 38, sleeve 36 carries a power take-off gear 54. Power take-off gear 54 meshes with opposed gears 56 and 58 which may be connected to drive any suitable auxiliaries such as magnets 60, and the like.

A gear 62 is mounted inside the hub of gear 34 and is connected to be driven thereby through splines 64 arranged on the inside of enlarged portion 38 of sleeve 36. Gear 62 will be hereafter referred to as the inside gear because of its peculiar relationship to gear 34. It should be noted that the inside diameter of the hub 66 of inside gear 62 is larger than the outside diameter of auxiliary shaft 42, so that there is no interference between them.

Inside gear 62 meshes with a pair of gears 68 and 70 which drive the camshafts of the V engine. One of these camshafts is shown in dotted lines at 72. Gears 68 and 70 drive their respective camshafts through auxiliary shafts rotatably mounted in housings 74 and 76 respectively. Gear 78 is driven by gear 68 and meshes with a gear 80 to drive its camshaft. Gear 82 is driven by gear 70 and meshes with a gear 84 to drive camshaft 72.

Between the ends of sleeve 18, there is mounted a power take-off gear 86 which meshes with a gear 88. Gear 88 may be connected to drive any desired auxiliary such as the oil pump indicated generally at 90.

Operation

In operation crankshaft 4 drives power take-off extension 10 which is connected at its outer end to the outer end of sleeve 18, thus rotating the sleeve. Sleeve 18 drives gear 32 which in turn drives the auxiliary shaft 42 through gear 34 and sleeve 36. The two camshafts are also driven by gear 32 through means which include inside gear 62 and gear 34. Additional auxiliaries are driven by power take-off gears 54 and 86.

As can be seen from the drawings, especially Fig. 1, the power train to gear 34 includes a yieldable shaft portion of substantial length: power take-off extension 10. This could not be accomplished in a compact design except by some expedient such as sleeve 18 which is doubled back on the extension. This arrangement gives the power train a torsional flexibility which better enables it to absorb shock than would be possible if gear 32 were mounted directly on the end of crankshaft 6. Additional flexibility beyond gear 34 is provided by shaft 42.

With all auxiliaries deriving power through shaft 10, it is unnecessary to make the casing for the auxiliaries line up precisely with the crankcase, because shaft extension 10 is self-aligning to a limited extent. Thus there is a considerable additional advantage over a design in which, for example, gear 32 would be mounted directly on the crankshaft.

Thus there is shown a V-type internal combustion engine having a power take-off arrangement which provides for multiple power take-offs in a compact mechanism taking up little space, which has a considerable degree of shock absorbing capacity, and which is easily mounted on the end of the crankcase.

I claim:

1. An accessory gear and power take-off transmission assembly adapted to be secured to an end crankcase face of an internal combustion engine and comprising an accessory casing, accessory transmission mechanism supported entirely within said accessory casing and comprising parallel sleeves supported in spaced bearings carried by said casing and carrying meshing gears at the inner ends thereof and disposed in a plane normal to the sleeve axes and substantially parallel to the inner end face of the accessory casing, driving and driven shafts respectively extending axially through said sleeves and drivingly connected thereto solely at their extreme outer ends.

2. An accessory gear and power take-off transmission assembly adapted to be secured to an end crankcase face of an internal combustion engine and comprising an accessory casing, accessory transmission mechanism supported entirely within said accessory casing and comprising parallel sleeves supported in spaced bearings carried by said casing and carrying meshing gears at the inner ends thereof and disposed in a plane normal to the sleeve axes and substantially parallel to the inner end face of the accessory casing, driving and driven shafts respectively extending axially through said sleeves and drivingly connected thereto solely at their extreme outer ends, said sleeves substantially enveloping said driving and driven shafts, said sleeves comprising torsional vibration dampening members.

3. An accessory gear and power take-off transmission assembly adapted to be secured to an end crankcase face of an internal combustion engine and comprising an accessory casing, accessory transmission mechanism supported entirely within said accessory casing and comprising parallel sleeves supported in spaced bearings carried by said casing and carrying meshing gears at the inner ends thereof and disposed in a plane normal to the sleeve axes and substantially parallel to the inner end face of the accessory casing, driving and driven shafts respectively extending axially through said sleeves and drivingly connected thereto solely at their extreme outer ends, said sleeves substantially enveloping said driving and driven shafts, said sleeves comprising torsional vibration dampening members, both said sleeves provided with beveled drive gears carried at substantially the middle portion, and driven accessories driven by said beveled gears and rotatably supported by said accessory casing about axes extending normal to said sleeve axes.

4. An accessory gear and power take-off transmission assembly adapted to be secured to an end crankcase face of an internal combustion engine and comprising an accessory casing, accessory transmission mechanism supported entirely within said accessory casing and comprising parallel sleeves supported in spaced bearings carried by said casing and carrying meshing gears at the inner ends thereof and disposed in a plane normal to the sleeve axes and substantially parallel to the inner end face of the accessory casing, driving and driven shafts respectively extending axially through said sleeves and drivingly connected thereto solely at their extreme outer ends, both said driving and driven shafts extending beyond the inner end face of the accessory casing and solely supported in said accessory casing by said drive connection with said sleeves substantially internally of the outer bearings supporting said sleeves.

5. An accessory gear and power take-off transmission assembly adapted to be secured to an end crankcase face of an internal combustion engine and comprising an accessory casing, accessory transmission mechanism supported entirely within said accessory casing and comprising parallel sleeves supported in spaced bearings carried by said casing and carrying meshing gears at the inner ends thereof and disposed in a plane normal to the sleeve axes and substantially parallel to the inner end face of the accessory casing, driving and driven shafts respectively extending axially through said sleeves and drivingly connected thereto solely at their extreme outer ends, the said sleeve connected with said driven shaft being provided with an enlarged inner end portion, and an inner gear secured in said enlarged inner end portion concentric with the first mentioned gear carried at the inner end of said sleeve, said inner gear having an axial bore through which said driven shaft extends, the axial bore in said inner gear being of such dimension as to have a clearance with respect to said driven shaft.

6. An accessory gear and power take-off transmission assembly adapted to be secured to an end crankcase face of an internal combustion engine and comprising an accessory casing, accessory transmission mechanism supported entirely within said accessory casing and comprising parallel sleeves supported in spaced bearings carried by said casing and carrying meshing gears at the inner ends thereof and disposed in a plane normal to the sleeve axes and substantially parallel to the inner end face of the accessory casing, driving and driven shafts respectively extending axially through said sleeves and drivingly connected thereto solely at their extreme outer ends, both said driving and driven shafts extending beyond the inner end face of the accessory casing and solely supported in said accessory casing by said drive connection with said sleeves substantially internally of the outer bearings supporting said sleeves, said casing having an inner wall carrying bearing portions for supporting the inner ends of said sleeves, and an outer wall spaced from said inner wall and carrying bearing portions for supporting the outer end of said sleeves, and other accessory transmission mechanisms supported within the accessory casing between said walls, and gears carried by an intermediate portion of said sleeves for driving said last mentioned accessory transmission mechanisms.

7. An accessory gear and power take-off transmission assembly adapted to be secured to an end crankcase face of an internal combustion engine and comprising an accessory casing, accessory transmission mechanism supported entirely within said accessory casing and comprising parallel sleeves supported in spaced bearings carried by said casing and carrying meshing gears at the inner ends thereof and disposed in a plane normal to the sleeve axes and substantially parallel to the inner end face of the accessory casing, driving and driven shafts respectively extending axially through said sleeves and drivingly connected thereto solely at their extreme outer ends, both said driving and driven shafts extending beyond the inner end face of the accessory casing and solely supported in said accessory casing by said drive connection with said sleeves substantially internally of the outer bearings supporting said sleeves, said casing having an inner wall carrying bearing portions for supporting the inner ends of said sleeves, and an outer wall spaced from said inner wall and carrying bearing portions for supporting the outer end of said sleeves, and other accessory transmission mechanisms supported within the accessory casing between said walls, and gears carried by an intermediate portion of said sleeves for driving said last mentioned accessory transmission mechanisms, the outer wall of said accessory casing having an enlarged bore coaxial with the sleeve enveloping said drive shaft and carrying an internal bearing, and a gear supported in said last mentioned bearing and internally splined to an intermediate portion of the aforesaid sleeve.

8. An accessory gear and power take-off transmission assembly adapted to be secured to an end crankcase face of an internal combustion engine and comprising an accessory casing, accessory transmission mechanism supported entirely within said accessory casing and comprising parallel sleeves supported in spaced bearings carried by said casing and carrying meshing gears at the inner ends thereof and disposed in a plane normal to the sleeve axes and substantially parallel to the inner end face of the accessory casing, driving and driven shafts respectively extending axially through said sleeves and drivingly connected thereto solely at their extreme outer ends, both said driving and driven shafts extending beyond the inner end face of the accessory casing and solely supported in said accessory casing by said drive connection with said sleeves substantially internally of the outer bearings supporting said sleeves, said casing having an inner wall carrying bearing portions for supporting the inner ends of said sleeves, and an outer wall spaced from said inner wall and carrying bearing portions for supporting the outer end of said sleeves, and other accessory transmission mechanisms supported within the accessory casing between said walls, and gears carried by an intermediate portion of said sleeves for driving said last mentioned accessory transmission mechanisms, the outer wall of said accessory casing having an enlarged bore coaxial with the sleeve enveloping said drive shaft and carrying an internal bearing, and a gear supported in said last mentioned bearing and internally splined to an intermediate portion of the aforesaid sleeve, the outer wall of said accessory casing having an enlarged bore coaxial with the sleeve enveloping said drive shaft and carrying an internal bearing, and a gear supported in said last mentioned bearing and internally splined to an intermediate portion of the aforesaid sleeve.

RICHARD E. HISS.

REFERENCES CITED

The following references are of record in the file of this patent:

UNITED STATES PATENTS

| Number    | Name         | Date          |
|-----------|--------------|---------------|
| 1,280,760 | Kirkham      | Oct. 8, 1918  |
| 1,308,465 | White        | July 1, 1919  |
| 1,319,510 | Birkigt      | Oct. 21, 1919 |
| 1,743,173 | Warner       | Jan. 14, 1930 |
| 2,098,718 | Caminez et al. | Nov. 9, 1937 |